(12) United States Patent
Cohen et al.

(10) Patent No.: US 10,243,741 B2
(45) Date of Patent: Mar. 26, 2019

(54) KEY EXCHANGE AND MUTUAL AUTHENTICATION IN LOW PERFORMANCE DEVICES

(71) Applicant: CHECK POINT SOFTWARE TECHNOLOGIES LTD., Tel Aviv (IL)

(72) Inventors: Yiftach Cohen, Ramat Gan (IL); Erez Geva, Petah Tikva (IL)

(73) Assignee: CHECK POINT SOFTWARE TECHNOLOGIES LTD., Tel Aviv (IL)

(*) Notice: Subject to any disclaimer, the term of this patent is extended or adjusted under 35 U.S.C. 154(b) by 169 days.

(21) Appl. No.: 15/473,656

(22) Filed: Mar. 30, 2017

(65) Prior Publication Data

US 2018/0287798 A1    Oct. 4, 2018

(51) Int. Cl.
| | | |
|---|---|---|
| *H04L 29/06* | (2006.01) | |
| *H04L 9/32* | (2006.01) | |
| *H04W 12/06* | (2009.01) | |
| *H04W 12/04* | (2009.01) | |
| *G06F 21/44* | (2013.01) | |

(52) U.S. Cl.
CPC .............. *H04L 9/321* (2013.01); *G06F 21/44* (2013.01); *H04L 9/3213* (2013.01); *H04L 63/0435* (2013.01); *H04L 63/061* (2013.01); *H04L 63/0869* (2013.01); *H04W 12/04* (2013.01); *H04W 12/06* (2013.01); *G06F 2221/2129* (2013.01)

(58) Field of Classification Search
CPC ..... H04W 12/04; H04W 12/06; H04W 12/08; G06F 21/44; H04L 63/0869; H04L 63/061; H04L 63/062; H04L 63/0442; H04L 63/0822
See application file for complete search history.

(56) References Cited

U.S. PATENT DOCUMENTS

| | | | | |
|---|---|---|---|---|
| 2011/0154039 A1* | 6/2011 | Liu | ....................... | H04L 63/061 713/170 |
| 2017/0214524 A1* | 7/2017 | Berard | ................... | H04W 8/245 |
| 2017/0310655 A1* | 10/2017 | Sethi | ................... | H04L 12/4633 |

* cited by examiner

*Primary Examiner* — Dao Q Ho
(74) *Attorney, Agent, or Firm* — Mark M. Friedman

(57) ABSTRACT

Securely exchanging keys to establish secure connections to low powered connected devices (LPCDs), such as smart devices and IoT (Internet Of Things) devices, and mutual authentication between these devices and third party controllers is accomplished via a higher performance machine configured with a dedicated remote service (DRS). A known symmetric pre-shared key (PSK) is used to establish a secure first connection between the LPCD and the DRS using another symmetric key. The DRS can then use asymmetric key exchange to securely send a new symmetric key to the 3P, and send the same new symmetric key to the LPCD using the secure first connection. This facilitates LPCDs to securely establish secure communications with other devices, in particular for control by third party (3P) devices. This also allows authentication of the LPCD with cloud services, and enables a DRS to vouch for associated devices to other DRSs.

3 Claims, 3 Drawing Sheets

KEY EXCHANGE AND MUTUAL AUTHENTICATION IN LOW PERFORMANCE DEVICES

FIELD OF THE INVENTION

The present invention generally relates to communications, and in particular, it concerns establishing secure connections.

BACKGROUND OF THE INVENTION

A proliferation of new (internet) connected devices raises a variety of opportunities, issues, and problems. Smart devices and IoT (Internet of Things) require connectivity for use. Secure connectivity is increasingly important, but conventional solutions are not practical for implementation with IoT devices, or have flaws that can compromise security of the devices.

SUMMARY

According to the teachings of the present embodiment there is provided a method for connecting devices including the steps of: establishing a secure first connection between a server and a first device; and providing, by the server, a secure third connection between a third device and the first device.

In an optional embodiment, the step of establishing includes the server: receiving from the first device, an identification of the first device; receiving from the first device an initial connection, the initial connection encrypted with a pre-shared key (PSK) of the first device; and sending to the first device an initial connection response, the initial connection response being encrypted with the PSK and including a first key for communicating securely via the secure first connection In another optional embodiment, the first key is a symmetric key for symmetrically encrypting the secure first connection. In another optional embodiment, the step of providing includes the server: receiving from the first device, via the secure first connection, a request to connect including an identification of the third device; sending the first device a server acknowledgement; providing, via a secure second connection, to the third device a third key; and providing via the secure first connection to the first device, the third key for communicating securely via the secure third connection.

In another optional embodiment, the server acknowledgement includes a token; and the step of providing, via a secure second connection, to the third device a third key, is based on the token.

In another optional embodiment, the third key is a symmetric key for symmetrically encrypting the secure third connection; and other than a first key that is a symmetric key for symmetrically encrypting the secure first connection.

According to the teachings of the present embodiment there is provided a system connecting devices including: a processing system containing one or more processors, the processing system being configured to: establish a secure first connection between a server and a first device; and provide, by the server, a secure third connection between a third device and the first device.

In an optional embodiment, the server is configured to establish by: receiving from the first device, an identification of the first device; receiving from the first device an initial connection, the initial connection encrypted with a pre-shared key of the first device; and sending to the first device an initial connection response, the initial connection response being encrypted with the PSK and including a first key for communicating securely via the secure first connection In another optional embodiment, the first key is a symmetric key for symmetrically encrypting the secure first connection. In another optional embodiment, the server is configured to provide by: receiving from the first device, via the secure first connection, a request to connect including an identification of the third device; sending the first device a server acknowledgement; providing, via a secure second connection, to the third device a third key; and providing via the secure first connection to the first device, the third key for communicating securely via the secure third connection.

In another optional embodiment, the server acknowledgement includes a token; and the step of providing, via a secure second connection, to the third device a third key, is based on the token.

In another optional embodiment, the third key is a symmetric key for symmetrically encrypting the secure third connection; and other than a first key that is a symmetric key for symmetrically encrypting the secure first connection.

According to the teachings of the present embodiment there is provided a non-transitory computer-readable storage medium having embedded thereon computer-readable code for connecting devices, the computer-readable code including program code for: establishing a secure first connection between a server and a first device; and providing, by the server, a secure third connection between a third device and the first device.

In an optional embodiment, the computer-readable code includes program code for establishing by: receiving from the first device, an identification of the first device; receiving from the first device an initial connection, the initial connection encrypted with a pre-shared key of the first device; and sending to the first device an initial connection response, the initial connection response being encrypted with the PSK and including a first key for communicating securely via the secure first connection In another optional embodiment, the first key is a symmetric key for symmetrically encrypting the secure first connection.

According to the teachings of the present embodiment there is provided a method for connecting devices including the steps of establishing a secure first connection between a first device and a server and; receiving from the server, via the secure first connection, a third key for providing a secure third connection between the first device and a third device.

In another optional embodiment, the step of establishing includes: from the first device, an identification of the first device; sending from the first device an initial connection, the initial connection encrypted with a pre-shared key of the first device; and receiving by the first device an initial connection response, the initial connection response being encrypted with the PSK and including a first key for communicating securely via the secure first connection In another optional embodiment, the first key is a symmetric key for symmetrically encrypting the secure first connection.

In another optional embodiment, further including the step of: receiving, from the third device, a third device connection request including a identification of the third device; and wherein the step of receiving includes the first device: sending to the server, via the secure first connection, a request to connect including the identification of the third device; receiving from the server a server acknowledgement; sending to the third device a first device acknowledgement; receiving, via the secure first connection, a third key for communicating securely via the secure third connection.

In another optional embodiment, the third key is a symmetric key for symmetrically encrypting the secure third connection; and other than a first key that is a symmetric key for symmetrically encrypting the secure first connection.

According to the teachings of the present embodiment there is provided a system for connecting devices including: a processing system containing one or more processors, the processing system being configured to: establish a secure first connection between a first device and a server and receive from the server, via the secure first connection, a third key for providing a secure third connection between the first device and a third device.

In an optional embodiment, the first device is configured to establish by sending from the first device, an identification of the first device; sending from the first device an initial connection, the initial connection encrypted with a pre-shared key of the first device; and receiving by the first device an initial connection response, the initial connection response being encrypted with the PSK and including a first key for communicating securely via the secure first connection In another optional embodiment, the first key is a symmetric key for symmetrically encrypting the secure first connection.

In another optional embodiment, the first device is further configured for: receiving, from the third device, a third device connection request including a identification of the third device; and wherein the receiving includes the first device: sending to the server, via the secure first connection, a request to connect including the identification of the third device receiving from the server a server acknowledgement; sending to the third device a first device acknowledgement; receiving, via the secure first connection, a third key for communicating securely via the secure third connection.

In another optional embodiment, the third key is a symmetric key for symmetrically encrypting the secure third connection; and other than a first key that is a symmetric key for symmetrically encrypting the secure first connection.

According to the teachings of the present embodiment there is provided a non-transitory computer-readable storage medium having embedded thereon computer-readable code for connecting devices, the computer-readable code including program code for: establishing a secure first connection between a first device and a server and; receiving from the server, via the secure first connection, a third key for providing a secure third connection between the first device and a third device.

In an optional embodiment, the computer-readable code includes program code for establishing by: sending from the first device, an identification of the first device; sending from the first device an initial connection, the initial connection encrypted with a pre-shared key of the first device; and receiving by the first device an initial connection response, the initial connection response being encrypted with the PSK and including a first key for communicating securely via the secure first connection In another optional embodiment, the first key is a symmetric key for symmetrically encrypting the secure first connection.

In another optional embodiment, the computer-readable code includes program code for: receiving, from the third device, a third device connection request including a identification of the third device; and wherein the step of receiving includes the first device: sending to the server, via the secure first connection, a request to connect including the identification of the third device receiving from the server a server acknowledgement; sending to the third device a first device acknowledgement; receiving, via the secure first connection, a third key for communicating securely via the secure third connection.

In another optional embodiment, third key is a symmetric key for symmetrically encrypting the secure third connection; and other than a first key that is a symmetric key for symmetrically encrypting the secure first connection.

According to the teachings of the present embodiment there is provided a method for connecting devices, including the steps of: a third device: sending, to a first device, a third device connection request including an identification of the third device; receiving from the first device a first device acknowledgement; and receiving from a server, via a secure second connection, a third key for communicating securely via a secure third connection between the third device and the first device.

In an optional embodiment, the third key is a symmetric key for symmetrically encrypting the secure third connection.

According to the teachings of the present embodiment there is provided a system for connecting devices including: a processing system containing one or more processors, the processing system being configured to: send, to a first device, a third device connection request including an identification of the third device; receive from the first device a first device acknowledgement; and receive from a server, via a secure second connection, a third key for communicating securely via a secure third connection between the third device and the first device.

In another optional embodiment, the third key is a symmetric key for symmetrically encrypting the secure third connection.

According to the teachings of the present embodiment there is provided a non-transitory computer-readable storage medium having embedded thereon computer-readable code for connecting devices, the computer-readable code including program code for: sending, to a first device, a third device connection request including an identification of the third device; receiving from the first device a first device acknowledgement; and receiving from a server, via a secure second connection, a third key for communicating securely via a secure third connection between the third device and the first device.

In another optional embodiment, wherein the third key is: a symmetric key for symmetrically encrypting the secure third connection.

BRIEF DESCRIPTION OF FIGURES

The embodiment is herein described, by way of example only, with reference to the accompanying drawings, wherein.

ABBREVIATIONS AND DEFINITIONS

Figure 1:
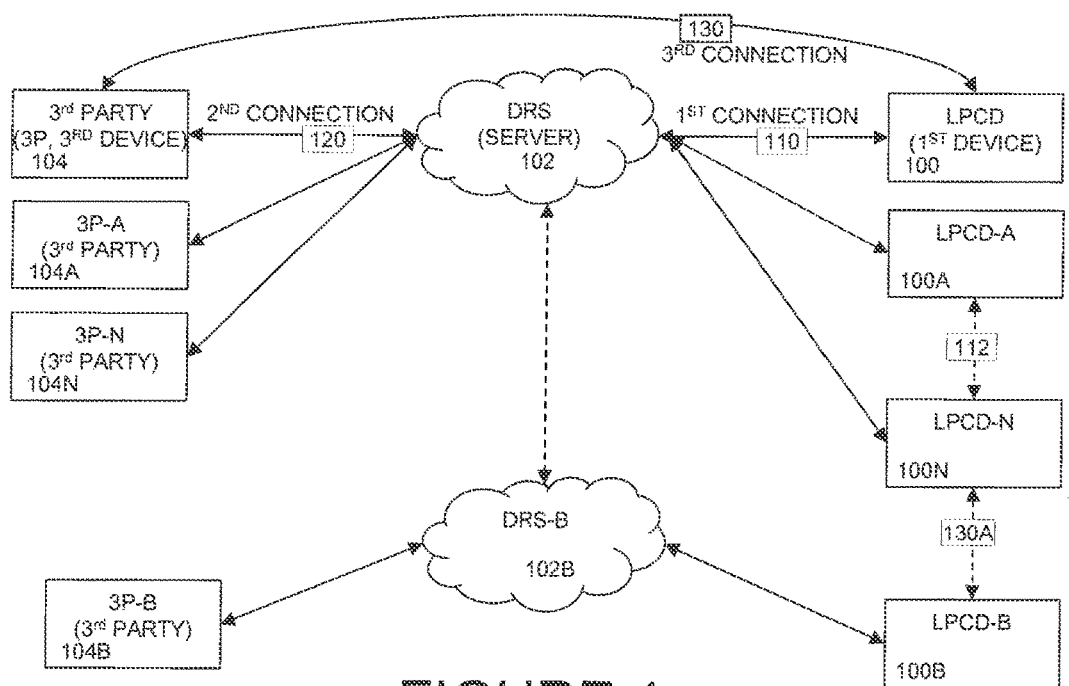
FIG. 1 is a diagram of secure connectivity between an LPCD and a third party (3P).

For convenience of reference, this section contains a brief list of abbreviations, acronyms, and short definitions used in this document. This section should not be considered limiting. Fuller descriptions can be found below, and in the applicable Standards.

3P—Third party, a computing device other than an LPCD and the LPCD's corresponding DRS.

3P-ID—identification of a third party device, generally unique.

ACK—Acknowledgement.

AES—Advanced Encryption Standard, a symmetric encryption algorithm.

Connected device—A device with connectivity for data collection and control.

DRS—Dedicated remote service.

ID—Public identification of a device.

IoT—Internet of things.

IV—Initialization vector.

KEY—Encryption key used between a DRS and an LPCD.

LPCD—Low performance connected device.

MAC—Media access control.

NEW KEY—Encryption key used between a 3P and an LPCD.

PSK—Pre shared key.

Rand—Random token.

TS—Time stamp.

URI—Uniform Resource Identifier, a string of characters used to identify a resource.

DETAILED DESCRIPTION—FIRST EMBODIMENT—FIGS. 1 TO 4

The principles and operation of the method and system according to a present embodiment may be better understood with reference to the drawings and the accompanying description. A present invention facilitates communication, in particular establishing secure connections with low performance connected devices.

A feature of the current embodiment is establishment of a secure connection between a low performance connected device (LPCD) and a third party (3P) (or other LPCD) via use of a higher performance dedicated remote service (DRS). A known symmetric pre-shared key (PSK) is used to establish a secure first connection between the LPCD and the DRS, the secure first connection using another symmetric key. The DRS can then use asymmetric encryption to securely send a new symmetric key to the 3P, and send the same new symmetric key to the LPCD using the secure first connection. This facilitates LPCDs to securely establish secure communications with other devices, in particular for control by third party (3P) devices.

There is a strong motivation to add connectivity to devices for data collection from, and control of, devices. In the context of this document, a device with connectivity is generally referred to as a "connected device". Exemplary connected devices include light bulbs, air conditioners, refrigerators, smoke detectors, and coffee makers. A proliferation of devices are currently in development and coming to market as smart devices and devices for the IoT (Internet of Things). Connectivity can include one or more wired or wireless connections to one or more other devices, servers, clients, hubs, and routers. For example, via a dedicated Wi-Fi link or ZigBee® mesh network.

In a case where the connected device must have, or is desired to have limited power consumption and/or lower cost, the built-in processing power of the device typically has low performance (to save power consumption and/or cost). In the context of this document, a connected device with low performance is referred to as a low performance connected device (LPCD). An example of an LPCD is a battery-operated smoke detector wirelessly connected to a home network. The smoke detector requires low power consumption so the battery does not drain quickly, requiring inconvenience of service by the homeowner and the expense of a new battery. Low performance can include slower processing, more limited processing capabilities, and less memory, typically to decrease transmitting, average power consumption, and/or standby power consumption, as compared to capabilities found in modern desktop, laptop, and mobile computers and devices. An example of a low performance device is an Arduino, with processing power of 1 core that ranges between 8 and 48 MHz. In contrast, high performance includes computer or mobile phones processors, for example, the 8 cores Qualcomm snapdragon with processing power of up to 1.7 GHz for each core.

Currently, many connected devices communicate with a dedicated remote service (DRS) to store and analyze data for the connected device's operation. Control of devices is typically from a third party (3P) device, for example from a central home control panel, Smartphone, or other LPCD.

Referring now to the drawings, FIG. 1, a diagram of secure connectivity between an LPCD and a third party (3P). Exemplary LPCD 100 can be one of a plurality of LPCDs, including LPCD-A 100A, LPCD-N 100N, and LPCD-B 100B. One or more LPCDs can be co-located on one or more local networks. For example, the LPCD 100, LPCD-A 100A, and LPCD-N 100N can be installed on the same intra-home network, while LPCD-B 100B is installed on another network. LPCDs are typically produced with a unique address (identification/public identifier, for example a MAC address or URI), pre-shared key (PSK), and address of a dedicated remote service (DRS). The address of the DRS is typically a unique address (for example, a URI).

When activated, a connected device typically tries to communicate with the DRS (with which the device has been configured). In the current figure, the LPCD 100, the LPCD-A 100A, and the LPCD-N 100N are associated with a DRS 102 via a first connection 110. The LPCD-B 100B is associated with a DRS-B 102B via another connection. Upon startup or reset, each of the LPCDs will attempt to communicate with the LPCD's associated DRS. One or more third parties may interact with one or more DRSs. In the current figure, a 3P 104, 3P-A 104A, and 3P-N 104N, are shown interacting with the DRS 102, and 3P-B 104B is shown interacting with the DRS-B 102B. Optionally, one or more DRSs can be in contact with each other, seen in the current figure as connectivity between the DRS 102 and the DRS-B 102B.

In the described embodiments, a DRS can be implemented as a module on one or more computing devices, a server, or in the Internet cloud. A typical implementation is as a cloud service (the DRS running on a private or public interact cloud). Another example is to implement the DRS as a module on a local gateway. More than one DRS (module, service) can run on a single machine. The DRS is normally remote from the network on which the LPCDs are deployed, for example, LPCDs on a home network connecting via the home network, home router, and service provider to the DRS in the cloud. However, the DRS can also be deployed locally, on the home The DRS is typically a service running on a remote machine and communicates with the LPCD. One DRS can serve many LPCDs.

Control of the LPCDs is typically from a third party (3P) device such as the 3P 104, 3P-A 104A, 3P-N 104N, and 3P-B 104B. An exemplary control connection is shown as a third connection 130 between the 3P 104 and the LPCD 100. A feature of the current embodiment is establishment of a secure third connection 130 via interaction with a DRS, as will be explained below. Optionally, LPCDs may have connectivity to other LPCDs for communication and/or control. For example, connection 112 between the LPCD-A 100A and LPCD-N 100N can be a mesh network connection allowing the LPCD-N 100N to communicate via the LPCD-A 100A that is in range of a network router for communications of the local network for control by the 3P-A 104A.

In another example, the DRS 102 can establish trust with the DRS-B 102B and setup a communication channel 130A for the LPCD-N 100N to communicate with the LPCD-B 100B. The current example can use as a basis the described method for the 3P 104 setting up communication with the LPCD 100, but in place of the 3P 104 use a combination of DRS-B 102B and LPCD-B 100B. The result of this implementation includes authenticated communication between LPCDs (exemplary LPCD 100 and LPCD-B 100B).

For clarity in this description, an exemplary case is used of the LPCD 100, connected via a first connection 110 to associated DRS 102. The DRS 102 is connected via the second connection 120 to third party (3P) 104. Operationally, the 3P 104 communicates via a third connection 130 to the LPCD 100. For clarity in this description, the DRS 102 may be referred to as a "server", to differentiate from LPCDs (first devices) and 3P devices (third devices). Note the use of low performance devices (LPCDs) is not limiting, and one or more of the devices and/or nodes in the system can be relatively higher performance, for example a laptop computer, desktop computer, wired and AC powered device such as a refrigerator or home entertainment system/set-top box, etc. In the context of this document, the term "DRS" is used to refer to a service, but can also be viewed as the machine on which the service is configured (is running). Based on this description, one skilled in the art will be able to implement other configurations with multiple LPCDs, DRSs, 3Ps, and connections.

Conventional LPCDs use symmetric encryption, for example AES, to secure communication with another party. Creating secure communication with symmetric encryption requires an encryption key to be shared between the two sides (devices or parties). This sharing of an encryption key is conventionally done either by using a single predetermined key, known as a pre shared key (PSK), embedded in a protocol, or by exchanging a key over unsecure channel. Both conventional methods have flaws that could lead to discovery of the key.

A preferred method for conventional LPCDs to use symmetric encryption, is to first use an asymmetric key exchange to establish a secure connection over which to exchange a symmetric key for subsequent secure communications. Asymmetric key exchange uses an asymmetric algorithm for key exchange, a method of exchanging cryptographic keys over a public channel without previous knowledge of exchanging parties. A well-know example is the Diffie Hellman algorithm. However, initiating an asymmetric communication channel requires processing power an order of magnitude more than symmetric communication, thus making this solution undesirable for power-limited LPCDs.

A method of the current embodiment facilitates securely exchanging keys for LPCDs, and further enables mutual authentication of LPCDs and DRS(s). A basis for this method is to use (begin by using) a single pre-shared key (PSK) stored on both the DRS and the LPCD. The PSK is a secret, known only to the LPCD and to the DRS, and associated with the identification (unique address) of the LPCD. Using the PSK, mutual authentication and secure communication can be initially established between the DRS and LPCD. Preferably, the DRS is hosted on a machine not limited by performance (as compared to the low power requirements of the LPCD). Hence, using asymmetric key exchange is feasible between the DRS and a third party (3P) to establish a secure channel between the DRS and the 3P. A new symmetric key can be generated and sent from the DRS to the 3P using the secure channel and to the LPCD using the PSK, enabling secure communications between the LPCD and the 3P.

Figure 2:
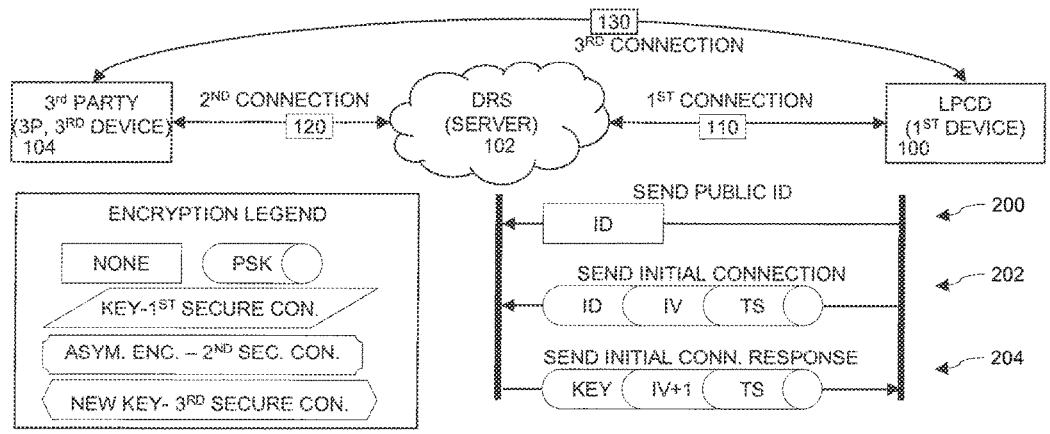
FIG. 2 is a diagram of establishing a secure connection between an LPCD and a DRS.

Refer now to FIG. 2, a diagram of establishing a secure connection between an LPCD and a DRS. In step 200, a method for connecting devices begins upon startup or reset of the LPCD 100, the LPCD 100 will attempt to communicate with the LPCD's associated DRS 102, as determined by the pre-configured identification of the DRS 102 on the LPCD 100. The LPCD 100 sends the LPCD's public identification (ID) to the DRS 102, and the DRS 102 receives from the LPCD 100 the ID. At this step, a first connection 110 between the LPCD 100 and the DRS 102 is not secure. Based on the received ID, the DRS can look up an associated PSK for the LPCD. Optionally, the LPCD 100 may have memory for storing one or more encryption keys (for example, the KEY or the NEW KEY described below), and upon startup or reset the LPCD 100 resumes operating using the stored key(s).

In step 202, the LPCD 100 sends an initial connection (block) to the DRS 102, and the initial connection is received by the DRS 102 from the LPCD 100. This initial connection is encrypted by the LPCD 100 with the PSK, and typically includes the ID, an initialization vector (IV), and a timestamp (TS).

The DRS 102 generates a first key (KEY) to use for operational communication with the LPCD 100 via symmetric encryption. As the KEY is not yet known to the LPCD 100, the KEY is initially sent to the LPCD 100 using the secure connection via the first connection 110 based on the PSK. After the LPCD 100 receives the KEY, subsequent communications between the LPCD 100 and the DRS 102 are not based on communications encrypted with the PSK, but are based on other encryption with a secure channel based on the KEY (a secure first connection). Note that when the first connection 110 is secured, the first connection 110 is referred to in this document as a secure first connection 110 (or alternatively referred to as a first secure connection).

This is accomplished in step 204 where the DRS 102 sends to the LPCD 100 an initial connection response, and the initial connection response is received by the LPCD 100 from the DRS 102. The initial connection response is encrypted by the DRS 102 with the PSK, and typically includes the KEY, an increment of the IV, and a timestamp TS. At this point, a secure first connection has been established using the KEY between the DRS 102 (server) and the LPCD 100 (first device). The first key (KEY) is preferably a symmetric key for symmetrically encrypting the secure first connection.

After a secure first connection has been established between the DRS 102 and the LPCD 100, then the DRS 102 (server) can provide (facilitate creation of) a secure connection (referred to in the context of this document as a "secure third connection" 130, or alternatively referred to as a third secure connection) between a third party (third device, 3P) 104 and the LPCD 100 (first device).

Note, for simplicity in the figures and this description, the label "TS" is used for all timestamps. However, one skilled in the art will realize that each timestamp is a different time, and alternatively the notation "TS1" could be used in the step 202 sending of an initial connection (block) 202, "TS2" could be used in the step 204 sending an initial connection response, and so forth.

Figure 3:
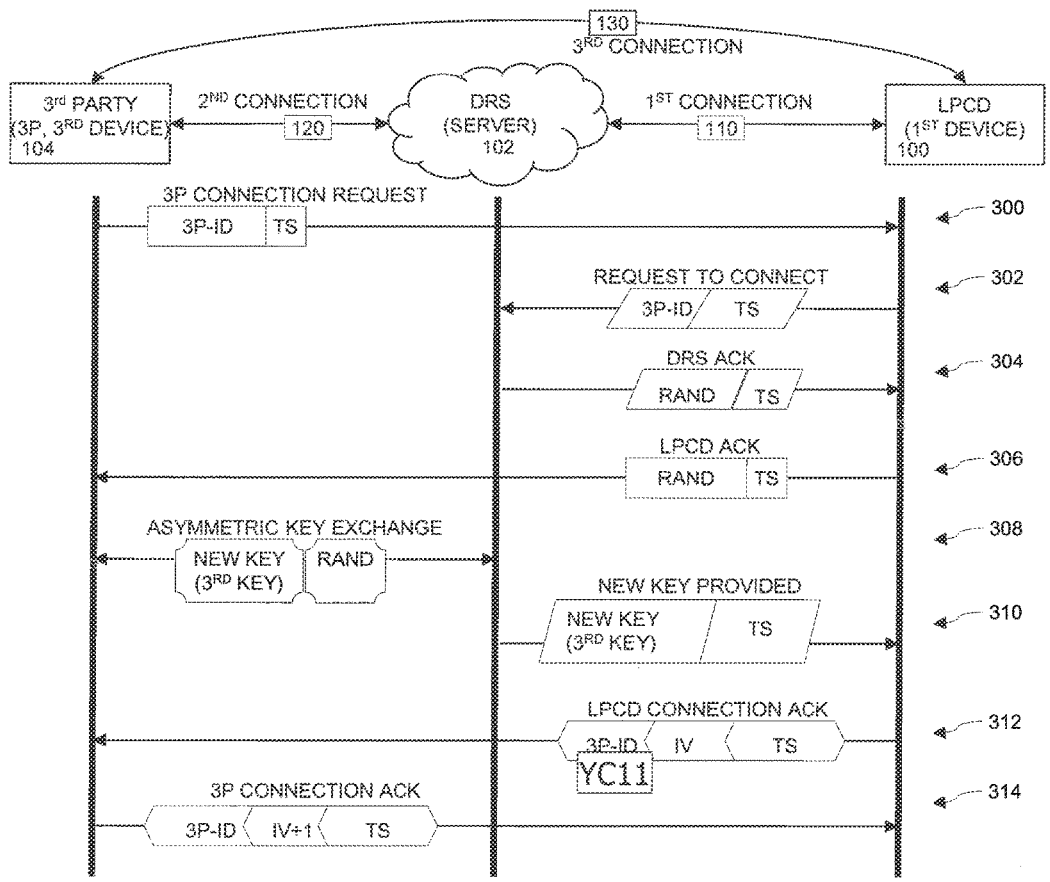
FIG. 3 is a diagram of establishing a secure connection between a third party (3P) and an LPCD.

Refer now to FIG. 3, a diagram of establishing a secure connection between a third party (3P) and an LPCD. In step 300, the third party (3P, third device, 104) sends a third party connection request to the LPCD 100 (first device). At this step, a third connection 130 between the 3P 104 and the LPCD 100 is not secure. This 3P connection request typically includes the identification of the 3P (3P-ID) and a timestamp (TS). In this step, the 3P 104 already knows that the LPCD 100 exists (via known techniques such as manual configuration, network discovery, etc.) so the 3P 104 can send the LPCD 100 a message requesting connection, for example using the identification of the LPCD (ID).

In step 302, the LPCD 100 sends to the DRS 102 a request to connect. The request to connect is sent over the secure first connection (encrypted with symmetric key KEY), and includes the 3P-ID and a timestamp TS.

In step 304, the DRS 102 sends to the LPCD 100 a DRS acknowledgement (server acknowledgement, DRS ACK). The DRS ACK is sent over the secure first connection (110, encrypted with symmetric key KEY). The DRS ACK preferably includes a token (RAND) to be used in validating a secure second connection (120), and includes a timestamp TS.

In step 306, the LPCD 100 sends to the 3P 104 a LPCD acknowledgement (first device acknowledgement, LPCD ACK). The LPCD ACK includes the token (RAND) and a timestamp TS.

In step 308, an asymmetric key exchange is performed between the DRS 102 and the 3P 104 to establish a secure second connection (120) (or alternatively referred to as a second secure connection). The secure second connection allows secure communication between the DRS 102 and the 3P 104. A third key (NEW KEY) is generated, typically by the DRS 102, and provided (sent) via the secure second connection 120 to the 3P 104. This third key will be used to establish a secure third connection 130 between the 3P 104 and the LPCD 100. Preferably, the asymmetric key exchange 308 is based on the token (RAND). The token (RAND) is used to distinguish the 3P from potential remote attackers.

In step 310, the DRS 102 provides (sends) the third key (NEW KEY) to the LPCD 100 via the secure first connection. Providing the new key includes a communication block including the third key (NEW KEY) and a timestamp TS. At this point, a secure third connection has been established using the third key (NEW KEY) between the 3P 104 (third device) and the LPCD 100 (first device). The third key (NEW KEY) is preferably a symmetric key for symmetrically encrypting the secure third connection. The third key is typically other than the first key (KEY).

In step 312, an LPCD connection acknowledgement (LPCD CONNECTION ACK) is sent from the LPCD 100 to the 3P 104 via the secure third connection 130. The LPCD connection acknowledgement includes the identification of the 3P (3P-ID), an initialization vector (IV), and a timestamp TS.

In step 314, the 3P 104 replies by sending a 3P connection acknowledgement (3P CONNECTION ACK) to the LPCD 100 via the secure third connection. The 3P connection acknowledgement includes the identification of the 3P (3P-ID), an increment of the IV, and a timestamp TS.

Figure 4:
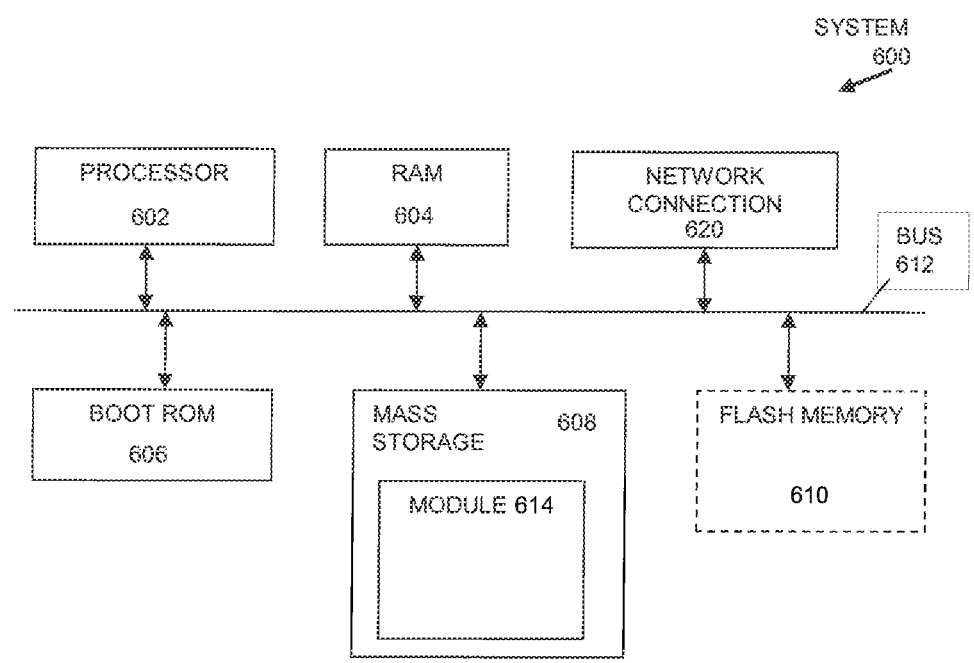
FIG. 4 is a high-level partial block diagram of an exemplary system.

FIG. 4 is a high-level partial block diagram of an exemplary system 600 configured to implement one or more systems of the present invention, including an LPCD 100, DRS 102, and 3P 104. System (processing system) 600 includes a processor 602 (one or more) and four exemplary memory devices: a RAM 604, a boot ROM 606, a mass storage device (hard disk) 608, and optionally a flash memory 610, all communicating via a common bus 612. As is known in the art, processing and memory can include any computer readable medium storing software and/or firmware and/or any hardware element(s) including but not limited to field programmable logic array (FPLA) element(s), hard-wired logic element(s), field programmable gate array (FPGA) element(s), and application-specific integrated circuit (ASIC) element(s). Any instruction set architecture may be used in processor 602 including but not limited to reduced instruction set computer (RISC) architecture and/or complex instruction set computer (CISC) architecture. A module (processing module) 614 is shown on mass storage 608, but as will be obvious to one skilled in the art, could be located on any of the memory devices.

Mass storage device 608 is a non-limiting example of a non-transitory computer-readable storage medium bearing computer-readable code for implementing the connection methodology described herein. Other examples of such computer-readable storage media include read-only memories such as CDs bearing such code.

System 600 may have an operating system stored on the memory devices, the ROM may include boot code for the system, and the processor may be configured for executing the boot code to load the operating system to RAM 604, executing the operating system to copy computer-readable code to RAM 604 and execute the code.

Network connection 620 provides communications to and from system 600. Typically, a single network connection provides one or more links, including virtual connections, to other devices on local and/or remote networks. Alternatively, system 600 can include more than one network connection (not shown), each network connection providing one or more links to other devices and/or networks.

System 600 can be implemented as a server or client respectively connected through a network to a client or server.

Note that a variety of implementations for modules and processing are possible, depending on the application. Modules are preferably implemented in software, but can also be implemented in hardware and firmware, on a single processor or distributed processors, at one or more locations. The above-described module functions can be combined and implemented as fewer modules or separated into sub-functions and implemented as a larger number of modules. Based on the above description, one skilled in the art will be able to design an implementation for a specific application.

Note that the above-described examples, numbers used, and exemplary calculations are to assist in the description of this embodiment. Inadvertent typographical errors, mathematical errors, and/or the use of simplified calculations do not detract from the utility and basic advantages of the invention.

To the extent that the appended claims have been drafted without multiple dependencies, this has been done only to accommodate formal requirements in jurisdictions that do not allow such multiple dependencies. Note that all possible combinations of features that would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. A method for connecting devices comprising the steps of:
    (a) establishing a secure first connection between a server and a first device; and
    (b) providing, by said server, a secure third connection between a third device and said first device,
    wherein said step of establishing includes said server:
        (i) receiving from said first device, an identification of said first device;
        (ii) receiving from said first device an initial connection, said initial connection encrypted with a pre-shared key (PSK) of said first device; and
        (iii) sending to said first device an initial connection response, said initial connection response being encrypted with said PSK and including a first key for communicating securely via said secure first connection,
    wherein said first key is a symmetric key for symmetrically encrypting said secure first connection,
    wherein said step of providing includes said server:
        (i) receiving from said first device, via said secure first connection, a request to connect including an identification of said third device;
        (ii) sending said first device a server acknowledgement;
        (iii) providing, via a secure second connection, to said third device a third key; and
        (iv) providing via said secure first connection to said first device, said third key for communicating securely via said secure third connection,
    wherein:
        (i) said server acknowledgement includes a token; and
        (ii) said step of providing, via a secure second connection, to said third device a third key, is based on said token,
    wherein said third key is:
        (i) a symmetric key for symmetrically encrypting said secure third connection; and
        (ii) other than a first key that is a symmetric key for symmetrically encrypting said secure first connection.

2. A system for connecting devices comprising:
    a processing system containing one or more processors, said processing system being configured to:
    (a) establish a secure first connection between a server and a first device; and
    (b) provide, by said server, a secure third connection between a third device and said first device,
    wherein said server is configured to establish by:
        (i) receiving from said first device, an identification of said first device;
        (ii) receiving from said first device an initial connection, said initial connection encrypted with a pre-shared key (PSK) of said first device; and
        (iii) sending to said first device an initial connection response, said initial connection response being encrypted with said PSK and including a first key for communicating securely via said secure first connection,
    wherein said first key is a symmetric key for symmetrically encrypting said secure first connection,
    wherein said server is configured to provide by:
        (i) receiving from said first device, via said secure first connection, a request to connect including an identification of said third device;
        (ii) sending said first device a server acknowledgement;
        (iii) providing, via a secure second connection, to said third device a third key; and
        (iv) providing via said secure first connection to said first device, said third key for communicating securely via said secure third connection,
    wherein:
        (i) said server acknowledgement includes a token; and
        (ii) said step of providing, via a secure second connection, to said third device a third key, is based on said token,
    wherein said third key is:
        (i) a symmetric key for symmetrically encrypting said secure third connection; and
        (ii) other than a first key that is a symmetric key for symmetrically encrypting said secure first connection.

3. A non-transitory computer-readable storage medium having embedded thereon computer-readable code for connecting devices, the computer-readable code including program code for:
    (a) establishing a secure first connection between a server and a first device; and
    (b) providing, by said server, a secure third connection between a third device and said first device,
    wherein said step of establishing includes said server:
        (i) receiving from said first device, an identification of said first device;
        (ii) receiving from said first device an initial connection, said initial connection encrypted with a pre-shared key (PSK) of said first device; and
        (iii) sending to said first device an initial connection response, said initial connection response being encrypted with said PSK and including a first key for communicating securely via said secure first connection,
    wherein said first key is a symmetric key for symmetrically encrypting said secure first connection,
    wherein said step of providing includes said server:
        (i) receiving from said first device, via said secure first connection, a request to connect including an identification of said third device;
        (ii) sending said first device a server acknowledgement;
        (iii) providing, via a secure second connection, to said third device a third key; and
        (iv) providing via said secure first connection to said first device, said third key for communicating securely via said secure third connection,
    wherein:
        (i) said server acknowledgement includes a token; and
        (ii) said step of providing, via a secure second connection, to said third device a third key, is based on said token,
    wherein said third key is:
        (i) a symmetric key for symmetrically encrypting said secure third connection; and
        (ii) other than a first key that is a symmetric key for symmetrically encrypting said secure first connection.

\* \* \* \* \*